Feb. 7, 1967 — O. R. TODNEM — 3,303,260
INDUCTION MELTING FURNACE
Filed March 19, 1964 — 2 Sheets-Sheet 1

Feb. 7, 1967     O. R. TODNEM     3,303,260

INDUCTION MELTING FURNACE

Filed March 19, 1964     2 Sheets-Sheet 2

3,303,260
INDUCTION MELTING FURNACE
Odd Ragnvald Todnem, Trondheim, Norway, assignor to Sintef, Trondheim, Norway
Filed Mar. 19, 1964, Ser. No. 353,183
Claims priority, application Norway, Mar. 27, 1963, 148,056
7 Claims. (Cl. 13—29)

This invention relates to furnaces which are based on the induction heating principle.

The induction furnaces which at present are in general use are based on two different principles:

(1) The material to be heated is placed in the magnetic alternating field inside an induction coil. There will then be induced an alternating current in the metallic material which is to be heated, and this current causes the heating.

(2) The material to be heated is arranged as a continuous ring around an induction coil on an iron core. This ring represents a short-circuited secondary circuit on a transformer, and the current in the ring leads to the desired heating.

These two principles for induction heating can be used both for heating treatment or hot working as well as for smelting. The present invention is, however, solely related to induction smelting furnaces.

A smelting furnace according to principle 1, with a refractory cylindrical crucible inside a cylindrical induction coil, is called a crucible furnace. The advantage of a furnace of this type is as follows:

(a) The crucible has a simple open shape, which is economical to make and easy to control and maintain.

(b) The crucible is open, so that the furnace can be started from cold state by charging with coarse scrap iron or precast start blocks.

(c) The furnace is in respect of construction very simple and compact.

The defects of this type of furnace are:

(a) Poor magnetic coupling, which leads to a power factor of 0.1 to 0.2. The requisite condenser battery for correcting is therefore comprehensive and costly.

(b) The furnace is in principle a single-phase plant. There must be used therefore a special symmetrization plant for coupling to the three-phase net.

(c) Both correction and symmetrization require adjustment during operation. The regulating and switching plant for a crucible furnace is therefore very comprehensive and costly.

(d) With use of the common supply frequency the power must be restricted, in order to avoid a too strong bath movement.

A smelting furnace according to principle 2, with melted metal in a ring-like channel round a horizontal induction coil, is termed a channel furnace. This induction furnace has the following advantages:

(u) The melt in the channel gets a good magnetic coupling with the coil, with a consequently good power factor 0.3 to 0.7. The necessary condenser battery is therefore modest, and this signifies a great reduction in the cost of the complete plant.

(v) The channel furnace can be adapted in a simple way to the three-phase supply system by using two channels and a Scott-connected transformer, or by use of three channels in one furnace. The solution is not simple or elegant, but is much used.

The drawbacks of the channel furnace are:

(w) The furnace chamber is provided with one or more channels, which are closed, and inaccessible for inspection and improvement.

(x) The flow movement in the narrow channel is insufficient, so that the temperature in the rear of the furnace is apt to be high, which means that the lifetime of the refractory lining will be short.

(y) The furnace does not dissipate any power unless there is enough metal for a continuous ring in the channel. As this furnace cannot be allowed to freeze with a metal sump in the furnace, it becomes necessary to fill the furnace from another smelting furnace if it is started cold, or if it is desired to go over to another type of alloy.

The experiments which led up to the present invention have as their object the development of a three-phase induction furnace for operation without symmetrization plant, in order to provide a crucible which is accessible in all respects and which can be started with coarse scrap iron or with precast start blocks, and better power factor than the known crucible furnaces, with a saving of condensers and a reduced need for adjustment during working.

Experiments were commenced by using a closed iron core, around a horizontally arranged central arm of which was looped a flat channel connected with the main hearth of a crucible. Two disc coils provided on the central arm, one on each side of the channel, were used to induce a current and heat the material within the channel. Measurements of the magnetic flux at various points in the central arm indicated that the part of it which was located within the channel was little utilized. Removal of this part of the core was not therefore detrimental to the operation of the furnace and provided additional space which, when incorporated into the channel, provided a furnace having a tongue shaped heat development chamber projecting downwards or outwards from the bottom of the main furnace hearth and being located between pole pieces provided with disc shaped induction coils.

During operation heat is developed in the metal which is in the tongue-shaped part of the crucible, and when the metal is molten there is caused a flow on account of the magnetic pressure, which drives the smelt into the main furnace hearth. The metal in the tongue, where the transfer of power occurs, is therefore subjected to a relatively heavy static pressure, which provides the conditions for great concentration of power. The refractory lining in a furnace made according to this principle, is completely accessible which is not the case with the channel furnace where the lining of the channel is inaccessible. Moreover, it is easily possible to place a start block or coarse start pieces in the tongue-shaped part in the event of cold starting.

For use with three phase current the tongue can be given a clover leaf shape and be placed in the air gap between three side pieces which lie, each with is coil, on a three-armed iron core. Over this clover-shaped part, where the heat development occurs, a cylindrical furnace hearth is located containing the major portion of the furnace contents. As regards static pressure, power concentration and maintenance of the crucible during operation, the same possibilities will be afforded here as mentioned for the single-phase embodiment. With this three-phase construction there is full symmetry, regardless of the working state. Nor does compensation (as a function of degree of filling and lead) need to be adjusted exactly as in the case of the crucible furnace, as full symmetry is obtained in any case.

Specific embodiments of the invention will now be described with reference to the accompanynig drawings, in which.

Figure 1:
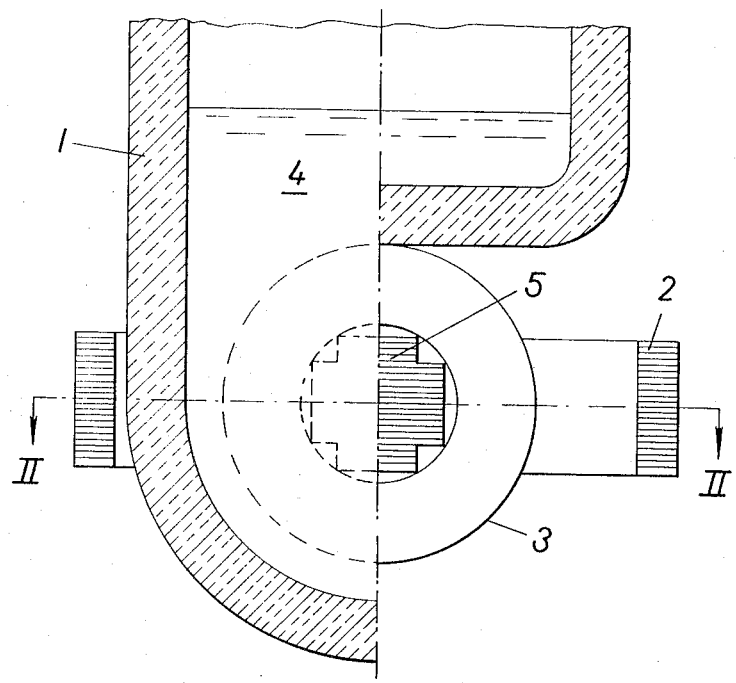
FIG. 1 shows in somewhat simplified form a furnace according to the invention in vertical section along the line I—I in FIG. 2.
Figure 2:
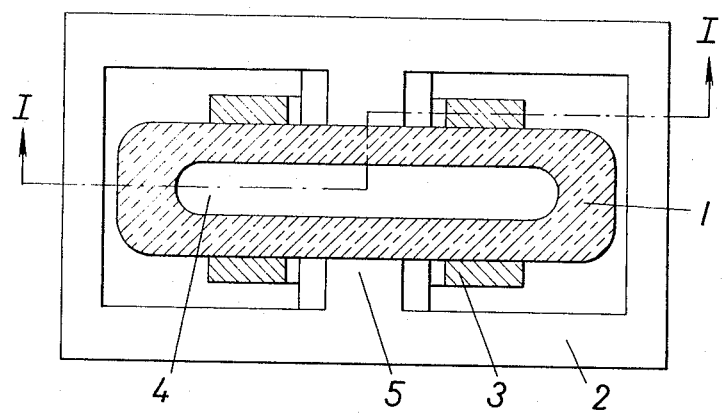
FIG. 2 shows a horizontal section along the line II—II in FIG. 1.

Referring to FIGURES 1 and 2, an induction melting furnace having a refractory lining 1 comprises a main furnace hearth for accommodating the major part of the smelt 4. From this main hearth, a narrow tongue-shaped heat development chamber projects downwards between central projecting pole pieces 5 of a surrounding iron core 2. Mounted on each pole piece is a disc shaped induction coil 3 which is parallel with and close to the heat development chamber side wall. The end wall of the chamber is made substantially thicker than the side walls to which the pole pieces are directed.

Figure 3:
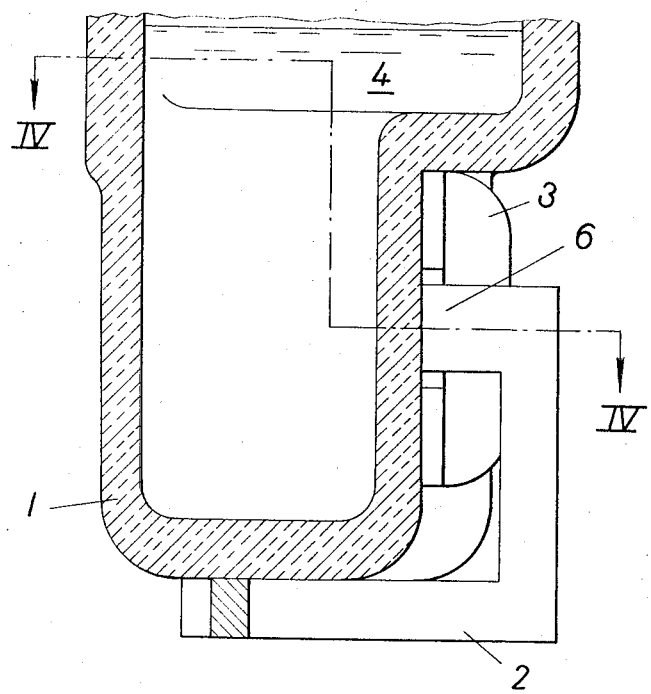
FIG. 3 shows in somewhat simplified form a furnace for three-phase operation, according to the invention, in vertical section along the line III—III in FIG. 4.
Figure 4:
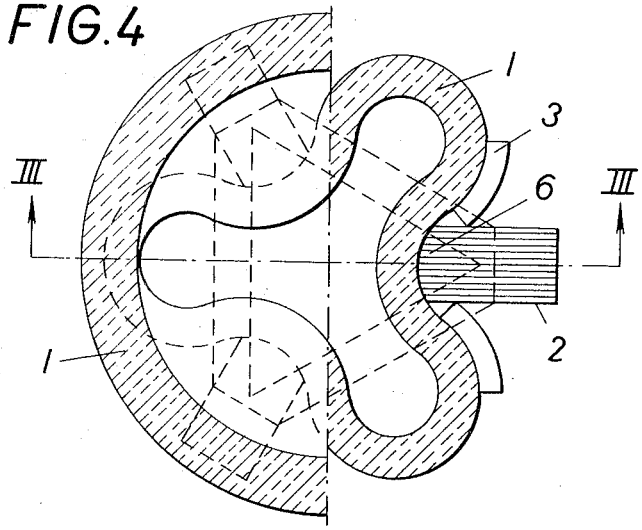
FIG. 4 shows a furnace for three-phase operation in section along the line IV—IV in FIG. 3.

In FIGS. 3 and 4 are shown an embodiment of a furnace according to the invention adapted for operation with three-phase current. The crucible 1 has in this case an upper cylindrical furnace chamber and a lower portion with clover-shaped section, which projects down into an iron core 2 having three symmetrical poles 6 with a spacing which leaves space for the lower portion of the furnace. Specially formed disc coils 3 are placed on the outside of the lower crucible part and mounted on the poles.

It will naturally be understood that the furnaces shown in the drawings have the usual devices for charging, tapping and supply of current, but as these devices do not form any part of the present invention they are omitted from the drawings.

As regards the preferred thickness dimension of the interior of the metal-filled tongue-shaped part, it should be mentioned that optimum heat development is obtained with a thickness ranging from 2 cm. to 10 cm.

I claim:

1. An induction melting furnace, comprising a crucible having a main furnace hearth and a tongue-shaped heat development chamber leading from the lower part thereof, an iron core having at least two projecting pole pieces, each directed towards a respective side wall of the heat development chamber, and a disc shaped induction coil on each of the pole pieces formed and arranged substantially parallel with the pertaining side wall.

2. An induction melting furnace as claimed in claim 1, comprising two pole pieces and wherein the side walls against which the pole pieces are directed are straight and parallel in plan view.

3. An induction melting furnace as claimed in claim 2, wherein the heat development chamber has end walls which are substantially thicker than said side walls.

4. An induction melting furnace as claimed in claim 1, wherein said heat development chamber is of smaller volume than said main furnace hearth.

5. An induction melting furnace as claimed in claim 1, wherein said heat development chamber is arranged below said main furnace hearth.

6. An induction melting furnace as claimed in claim 1, wherein said heat development chamber is arranged laterally of said main furnace hearth.

7. An induction melting furnace as claimed in claim 1, for use with three phase current, wherein said heat development chamber has three tongue-shaped sub-chambers extending radially from the central part of said heat development chamber, and three projecting pole pieces are provided each directed towards a respective recess between two sub-chambers, the disc shaped induction coils lying close to and following the curve of the heat development chamber.

References Cited by the Examiner

UNITED STATES PATENTS

| 969,261 | 9/1910 | De Ferranti | 13—29 |
| 2,669,931 | 2/1954 | Godbold | 13—29 |
| 2,993,943 | 7/1961 | Cooke | 13—29 |
| 3,222,446 | 12/1965 | Kolle | 13—29 |

FOREIGN PATENTS

| 780,646 | 4/1935 | France. |
| 879,879 | 3/1943 | France. |
| 1,387,632 | 12/1964 | France. |
| 724,184 | 8/1942 | Germany. |

RICHARD M. WOOD, *Primary Examiner.*

L. H. BENDER, *Assistant Examiner.*